United States Patent
Shuma

(10) Patent No.: US 9,208,538 B2
(45) Date of Patent: Dec. 8, 2015

(54) ROTATED RECTANGLE DRAWING ON ELECTRONIC DEVICES

(71) Applicant: Google Inc., Mountain View, CA (US)

(72) Inventor: James Jeffrey Shuma, San Jose, CA (US)

(73) Assignee: Google Inc., Mountain View, CA (US)

( * ) Notice: Subject to any disclaimer, the term of this patent is extended or adjusted under 35 U.S.C. 154(b) by 392 days.

(21) Appl. No.: 13/671,493

(22) Filed: Nov. 7, 2012

(65) Prior Publication Data

US 2015/0154768 A1 Jun. 4, 2015

(51) Int. Cl.
*G09G 5/00* (2006.01)
*G06T 3/60* (2006.01)
*G06K 9/00* (2006.01)
*G06F 3/048* (2013.01)

(52) U.S. Cl.
CPC . *G06T 3/60* (2013.01); *G06F 3/048* (2013.01); *G06K 9/00* (2013.01); *G09G 2320/068* (2013.01)

(58) Field of Classification Search
None
See application file for complete search history.

(56) References Cited

U.S. PATENT DOCUMENTS

| | | | |
|---|---|---|---|
| 5,396,590 A | 3/1995 | Kreegar | |
| 5,956,043 A | 9/1999 | Jensen | |
| 6,346,948 B1 | 2/2002 | Evans et al. | |
| 6,721,652 B1 | 4/2004 | Sanqunetti | |
| 7,738,730 B2 * | 6/2010 | Hawley | 382/281 |
| 7,773,829 B1 * | 8/2010 | Brandt | 382/294 |
| 7,817,854 B2 | 10/2010 | Taylor | |
| 2004/0013318 A1 * | 1/2004 | Simske et al. | 382/289 |
| 2010/0265177 A1 * | 10/2010 | Fujimoto et al. | 345/162 |

OTHER PUBLICATIONS

Lins, Rafael Dueire, and Bruno Tenorio Ávila., "A new algorithm for skew detection in images of documents." Image Analysis and Recognition. Springer Berlin Heidelberg, 2004. 234-240.*
"Creating Rectangles", Vectorworks, 2009, retrieved from <http://download2.nemetschek.net/www_misc/2009/getting_started/architect/VWHelp/Vectorworks%20Fundamentals/wwhelp/wwhimpl/common/html/wwhelp.htm#href=06_2DObjects.7.31.html&single=true>.
"GIMP Rotate Tool—A Look at the Rotate Tool in GIMP", About.com Graphics Software, last viewed Nov. 7, 2012, retrieved from <http://graphicssoft.about.com/od/gimptutorials/a/rotate-tool.htm>.
"Move Tools", paint.net Documentation, 2010, retrieved from <http://www.getpaint.net/doc/latest/MoveTools.html>.
"How to Control the Axis Orientation in SketchUp", eHow Tech, last viewed Nov. 7, 2012, retrieved from <http://www.ehow.com/how_8432815_control-axis-orientation-sketchup.html>.
Murdock, "Google SketchUp and SketchUp Pro 7 Bible", 2009, pp. 479, retrieved from <http://www.scribd.com/doc/89026956/377/Rotated-Rectangle>.

* cited by examiner

*Primary Examiner* — Ming Hon
*Assistant Examiner* — Sarah Le
(74) *Attorney, Agent, or Firm* — Dority & Manning, P.A.

(57) ABSTRACT

Methods for drawing a rotated rectangle on an electronic device are provided. In one aspect, a method includes receiving content configured for display and analyzing the content to identify a skew angle associated with the content. The method also includes receiving an input request to draw a rectangle overlaid upon the content, and providing, for display, the rectangle overlaid upon the content based upon the input request, the rectangle rotated according to the skew angle. Systems and machine-readable media are also provided.

20 Claims, 8 Drawing Sheets

ROTATED RECTANGLE DRAWING ON ELECTRONIC DEVICES

BACKGROUND

1. Field

The present disclosure generally relates a display of information on an electronic device, and more particularly to graphical design on an electronic display.

2. Description of the Related Art

A common choice for creating a rectangle shape (e.g., for performing a selection of content or to draw the rectangle shape) in a graphical user interface is a click-and-drag tool that permits a user to create a rectangle shape aligned with the X-Y axes of the graphical user interface. If a user seeks to create a rectangle shape that is not aligned with the X-Y axes of the graphical user interface, the user can either take an additional step of rotating the rectangle shape to a different X-Y axes that is not aligned with the graphical user interface after the rectangle shape has been created, or to the best degree possible, manually draw four separate lines to create four edges of a rotated rectangle. It is often inconvenient and time consuming for users to take the additional step of rotating after creating the rectangle. It is also difficult for users to adequately predict a needed size for a rectangle prior to rotating a created rectangle, with users often realizing upon rotation that their created rectangle is either too small or too big for its intended purpose. Such process takes additional time of the user. It is further difficult to manually draw four separate lines in a way that each pair of opposing edge lines is parallel.

SUMMARY

According to one embodiment of the present disclosure, a computer-implemented method for drawing a rotated rectangle on an electronic device is provided. The method includes receiving content configured for display and analyzing the content to identify a skew angle associated with the content. The method also includes receiving an input request to draw a rectangle overlaid upon the content, and providing, for display, the rectangle overlaid upon the content based upon the input request, the rectangle rotated according to the skew angle.

According to another embodiment of the present disclosure, a system for drawing a rotated rectangle on an electronic device is provided. The system includes a memory that includes content configured for display, and a processor. The processor is configured to execute instructions to analyze the content to identify a skew angle associated with the content and receive an input request to draw a rectangle overlaid upon the content. The processor is also configured to execute instructions to provide, for display, the rectangle overlaid upon the content based upon the input request, the rectangle rotated according to the skew angle. The content includes a raster image.

According to a further embodiment of the present disclosure, a machine-readable storage medium includes machine-readable instructions for causing a processor to execute a method for drawing a rotated rectangle on an electronic device is provided. The method includes receiving content includes a raster image of a map configured for display and analyzing the content to identify a skew angle associated with the content using at least one of a Hough transform and a Radon transform to identify a dominant angle of at least a portion of the raster image, wherein the skew angle is based on the dominant angle. The method also includes receiving an input request to draw a rectangle overlaid upon the content and providing, for display, the rectangle overlaid upon the content based upon the input request, the rectangle rotated according to the skew angle.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
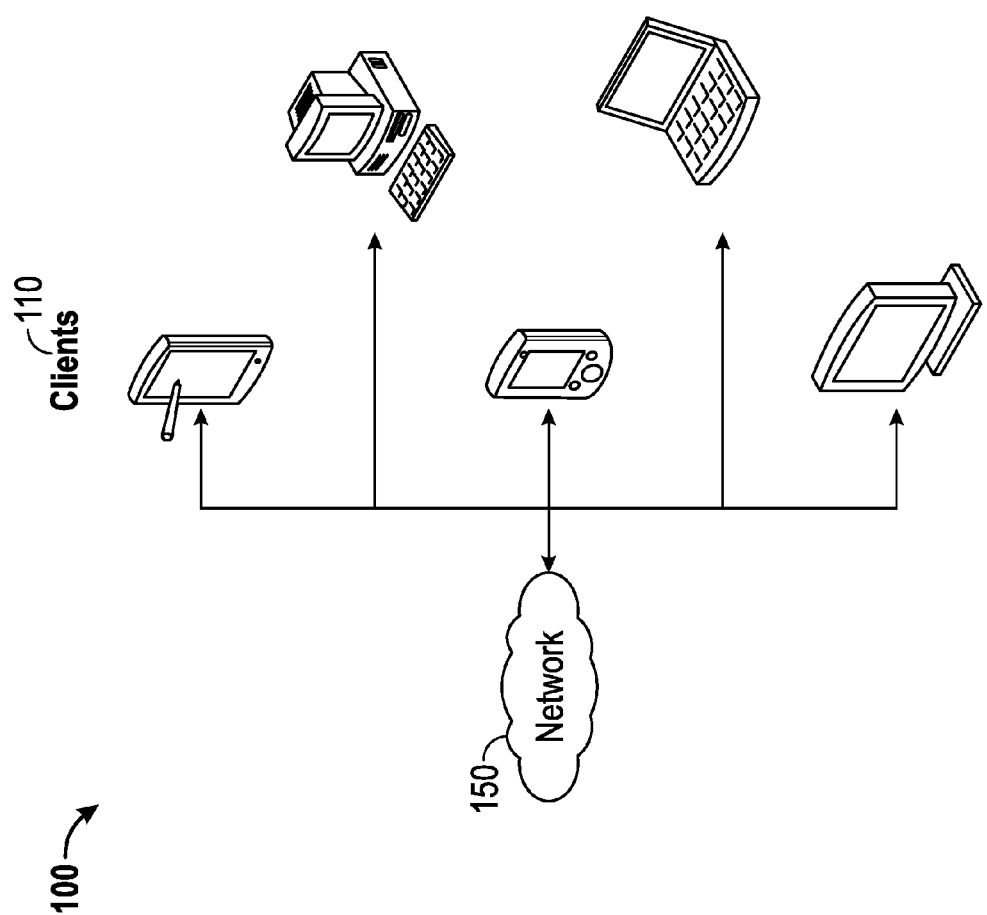
FIG. 1 illustrates an example architecture for drawing a rotated rectangle on an electronic device.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed interface provides for the drawing of a rotated rectangle on a canvas on an electronic device. The interface first identifies a skew angle for the canvas (e.g., a drawing or image), and then draws a rectangle based on the identified skew angle. The skew angle can either be provided by a user or determined automatically based on content of the canvas.

The user can provide the skew angle by drawing on the canvas a line having the skew angle. Alternatively, the interface can automatically identify a skew angle for the canvas by analyzing the canvas (e.g., a raster graphics image such as a bitmap that is an aerial photograph of a geographic region.) using Hough or Radon transforms to identify a dominant angle for lines or edges of the canvas. The interface can also automatically identify a skew angle for the canvas by analyzing user-defined content on the canvas, such as a line drawing indicating a road map. For example, user-defined geographic indicators like streets or previously drawn shapes can be analyzed to find a dominant angle for the geographic indicators of the canvas. The dominant angle can then define the skew angle for either x-axis or y-axis of the canvas. The interface can also use more than one skew angle (e.g., identified from a raster graphics image that includes two dominant angles obtained from two separate sets of substantially parallel lines). Rectangles can be drawn in alignment with the axis defined by the skew angle(s). Once the skew angle is identified, the same skew angle may be used to draw multiple rotated rectangles.

FIG. 1 illustrates an example architecture 100 for drawing a rotated rectangle on an electronic device. The architecture 100 includes clients 110 that can be connected to a network 150.

The disclosed graphical user interface system is configured to run on each of the clients 110. The graphical user interface receives an input request on a client 110 to draw a rectangle on a canvas and then proceeds to draw a rotated rectangle (i.e., not aligned with the x-y axes of the graphical user interface of the client 110) based on features of the canvas that indicate the canvas has non-aligned x-y axes. For example, if the canvas is a raster image of a geographic region, then the configuration of certain geographical indicators such as roads and buildings can analyzed to determine whether the geographical indicators are aligned along a non-aligned x-y axes relative to the x-y axes of the graphical user interface. As another example, if the canvas includes certain user inputs, such as user-drawn roads or buildings, then the configuration of the user inputs can be analyzed to determine whether the user inputs are aligned along a non-aligned x-y axes relative to the x-y axes of the raster image. In both examples, the analysis may yield a skew angle by which the x-y axes of the geographical indicators or user inputs are rotated about the x-y axes of the raster image. As yet another example, a user may simply provide the skew angle by which to rotate the x-y axes for the drawing of rectangular shapes. Using the determined skew angle, rectangular shapes may be drawn on the canvas that are rotated according to the skew angle and therefore may possibly be unaligned with the x-y axes of the raster image.

The clients 110 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities. Each client 110 can be connected to the network 150. For example, a client 110 can be connected to the network 150 in order to initially download the disclosed graphical user interface system from one or many servers (not illustrated). The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
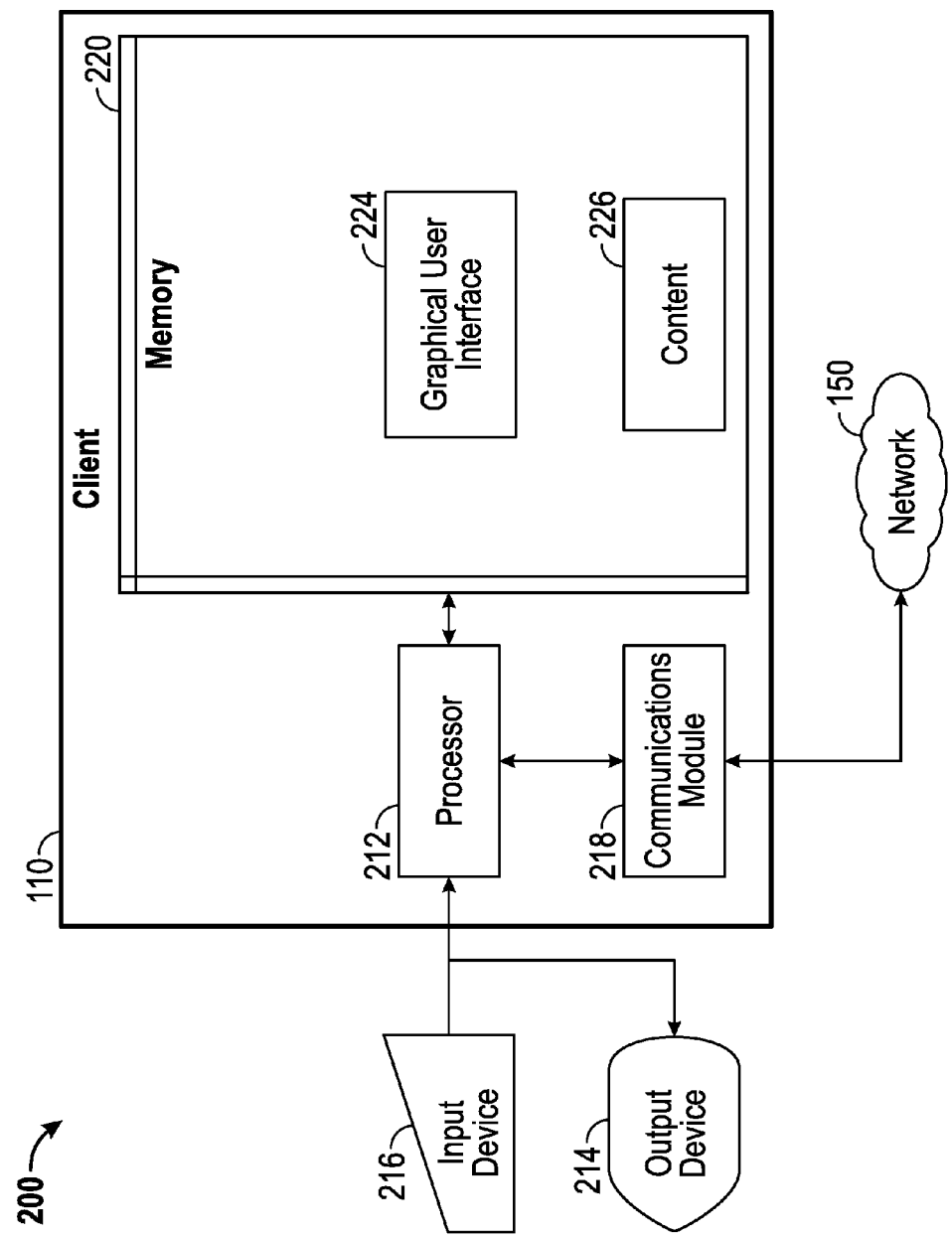
FIG. 2 is a block diagram illustrating the example client from the architecture of FIG. 1 according to certain aspects of the disclosure.

FIG. 2 is a block diagram 200 illustrating an example client 110 in the architecture 100 of FIG. 1 according to certain aspects of the disclosure. The client 110 can be connected to the network 150 via a communications module 218. The communications module 218 is configured to interface with the network 150 to send and receive information, such as data, requests, responses, and commands to other devices on the network. The communications module 218 can be, for example, a modem or Ethernet card.

The client 110 includes a processor 212, the communications module 218, and the memory 220 that includes the graphical user interface 224 and the content 226 for display. The client 110 also includes an input device 216, such as a keyboard, mouse, or touch input, and an output device 214, such as a display. An input device 216 such as a keyboard or mouse can provide a pointing device actions indicating where to begin a drawing of a rectangle and where to complete the drawing of the rectangle. The pointing device actions can include down actions (e.g., pressing a button on a mouse, a key on a keyboard, or touching a touchscreen with a finger) and up actions (e.g., releasing the pressed button on the mouse, the pressed key on the keyboard, or removing the finger from the touchscreen).

In certain aspects, the content 226 of the image file in memory 220 can be in a raster format, vector format, compound format, or stereo format. Example raster formats include JPEG/JFIF, JPEG 2000, Exif, TIFF, RAW, GIF, BMP, PNG, PPM, PGM, PBM, PNM, WEBP, and HDR raster formats such as RGBE (Radiance HDR), TIFF, and IFF-RGFX. Example vector formats include CGM, Gerber Format (RS-274X), various other 2D vector formats, and 3D vector formats. Example stereo formats include MPO, PNS, and JPS. As an example, the content 226 can include an aerial photograph of a geographic region or a map of a geographic region. The content 226 can also include user-defined input, such as indicators of roads, buildings, geographical landmarks, and other geographic features.

The processor 212 of the client 110 is configured to execute instructions, such as instructions physically coded into the processor 212, instructions received from software in memory 240, or a combination of both. For example, the processor 212 of the client 110 executes instructions to draw a rotated rectangle on the client 110. A rotated rectangle as discussed herein includes rectangles rotated zero degrees about the x-y axes of a graphical user interface (e.g., a rectangle that is aligned with the x-y axes of the graphical user interface).

The processor 212 of the client 110 executes instructions from the graphical user interface 224 causing the processor 212 to receive content 226 configured for display (e.g., on the output device 214) and analyze the content 226 to identify a skew angle associated with the content. In certain aspects, the entire content 226 is analyzed to identify the skew angle. For example, where the content 226 represents an image of a city map, the city map is analyzed. In certain other aspects, a subset of the content 226 is analyzed to identify the skew angle. For example, where the content 226 represents an aerial photograph of a diverse geographic region, a smaller portion of the geographic region is analyzed. The subset of the content 226 may be identified by a user.

For example, the content 226 can be analyzed using a Hough transform or a Radon transform to identify a dominant angle of at least a portion of the raster image relative to the graphical user interface 224. Application of a Hough transform or Radon transform facilitates the detection of lines and other edges in the content 226. The detected lines may then be analyzed to identify an angle by which one or many of the detected lines are rotated relative to the default x-y axes of the graphical user interface 224. In instances where a plurality of lines is detected having slight variations in degrees (e.g., less than 45 degrees), the plurality of lines may be averaged (e.g., using a Bell curve) to determine a single dominant angle. For example, if there are two approximately parallel sets of roads that are not exactly parallel, it may be desirable to draw two separate basis angles rather than just one angle.

As another example, the content 226 can be analyzed using one or many user-defined inputs to identify a dominant angle of the user-defined inputs. For instance, if the content 226 includes several lines drawn by a user indicating roads in a geographic region, the placement and angles of the lines is analyzed to determine a dominant angle. The skew angle is equal to or otherwise based on the dominant angle of the analyzed content 226.

As yet another example, a user may manually provide the skew angle. For example, an input field may be provided for display within the graphical user interface 224 that permits a user to select a skew angle for drawing rotated rectangles. As another example, the user can provide the skew angle by drawing on the canvas a line having the skew angle.

The processor 212 is configured to receive an input request to draw a rectangle overlaid upon the content 226. The input request may identify a rectangle size, a rectangle location, and/or a rectangle orientation. For example, using a mouse as the input device 216, a user can click a mouse button at a first location relative to the content 226 in order to indicate a first corner for a rectangle, and click a second location relative to the content 226 in order to indicate a second, opposing corner (diagonally opposite the first corner) for the rectangle. The remaining two corners for the rectangle, and thus the rectangle size, are determined based on the first corner and the second corner.

The processor 212 is further configured to provide, for display, the rectangle overlaid upon the content 226 based upon the input request. For example, the rectangle is provided for display overlaid on content 226 that includes a raster image. The rectangle is rotated according to the skew angle.

Figure 3:
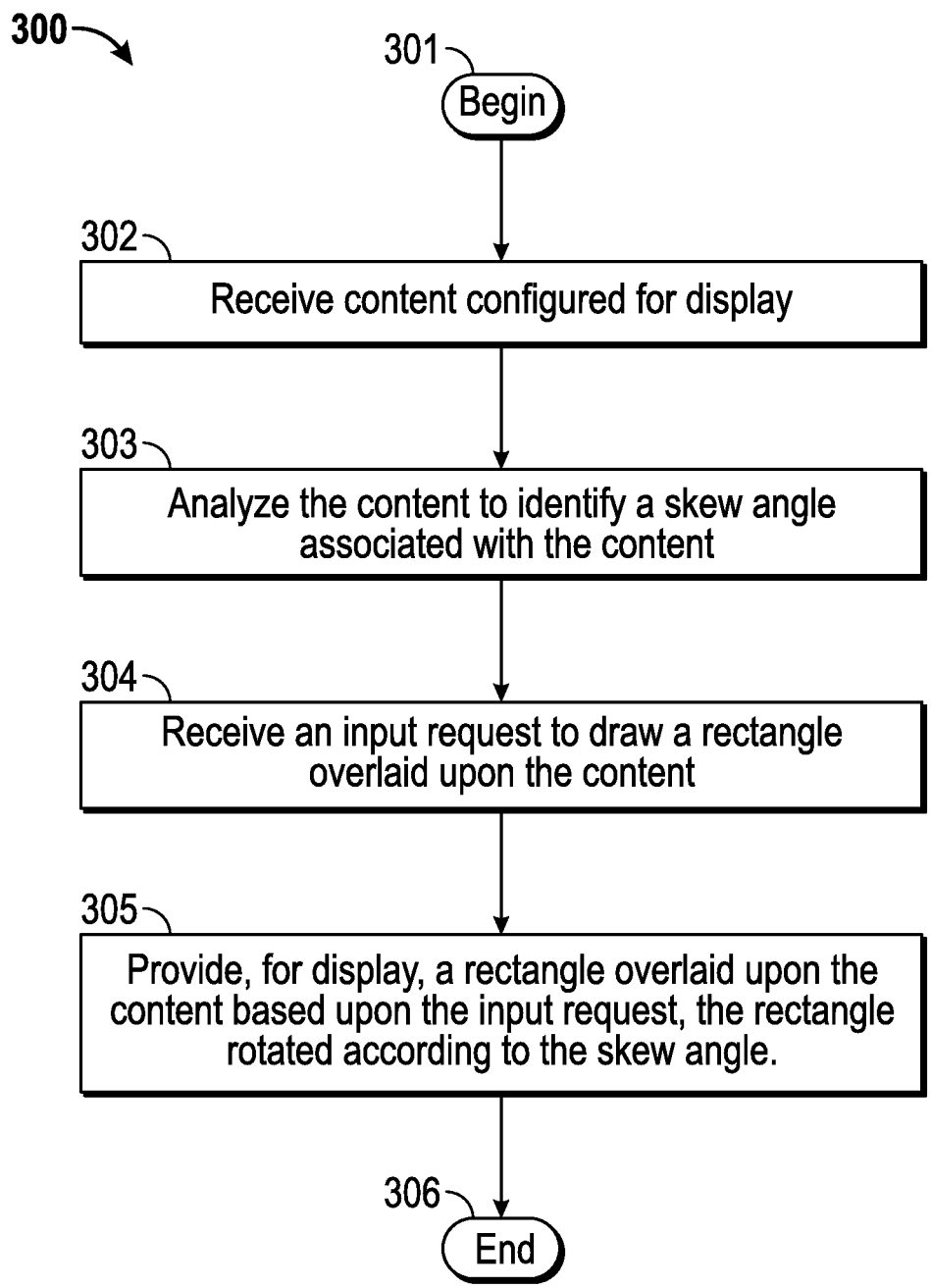
FIG. 3 illustrates an example process for drawing a rotated rectangle on an electronic device using the example client of FIG. 2.

FIG. 3 illustrates an example process 300 for drawing a rotated rectangle on a client 110 using the example client 110 of FIG. 2. While FIG. 3 is described with reference to FIG. 2, it should be noted that the process steps of FIG. 3 may be performed by other systems.

The process 300 begins by proceeding from beginning step 301 when a graphical user interface 224 for drawing a rectangle is opened on the client 110 to step 302 when content 226 configured for display is received. The content 226 may already be stored in memory 220 of the client 110 and received by the processor 212 from memory 220, or the content may be downloaded over the network 150 from a server. In step 303, the content 226 is analyzed to identify a skew angle associated with the content 226, and in step 304 an input request is received on the client 110 (e.g., from input device 216) to draw a rectangle overlaid upon the content 226. In step 305, the rectangle overlaid upon the content is provided for display (e.g., on output device 214) based upon the input request. The rectangle is rotated according to the skew angle. The process 300 ends in step 306.

FIG. 3 set forth an example process 300 for drawing a rotated rectangle using the example client 110 of FIG. 2. An example will now be described using the example process 300 of FIG. 3 and content that is a raster image representing a geographic region.

Figure 4A:
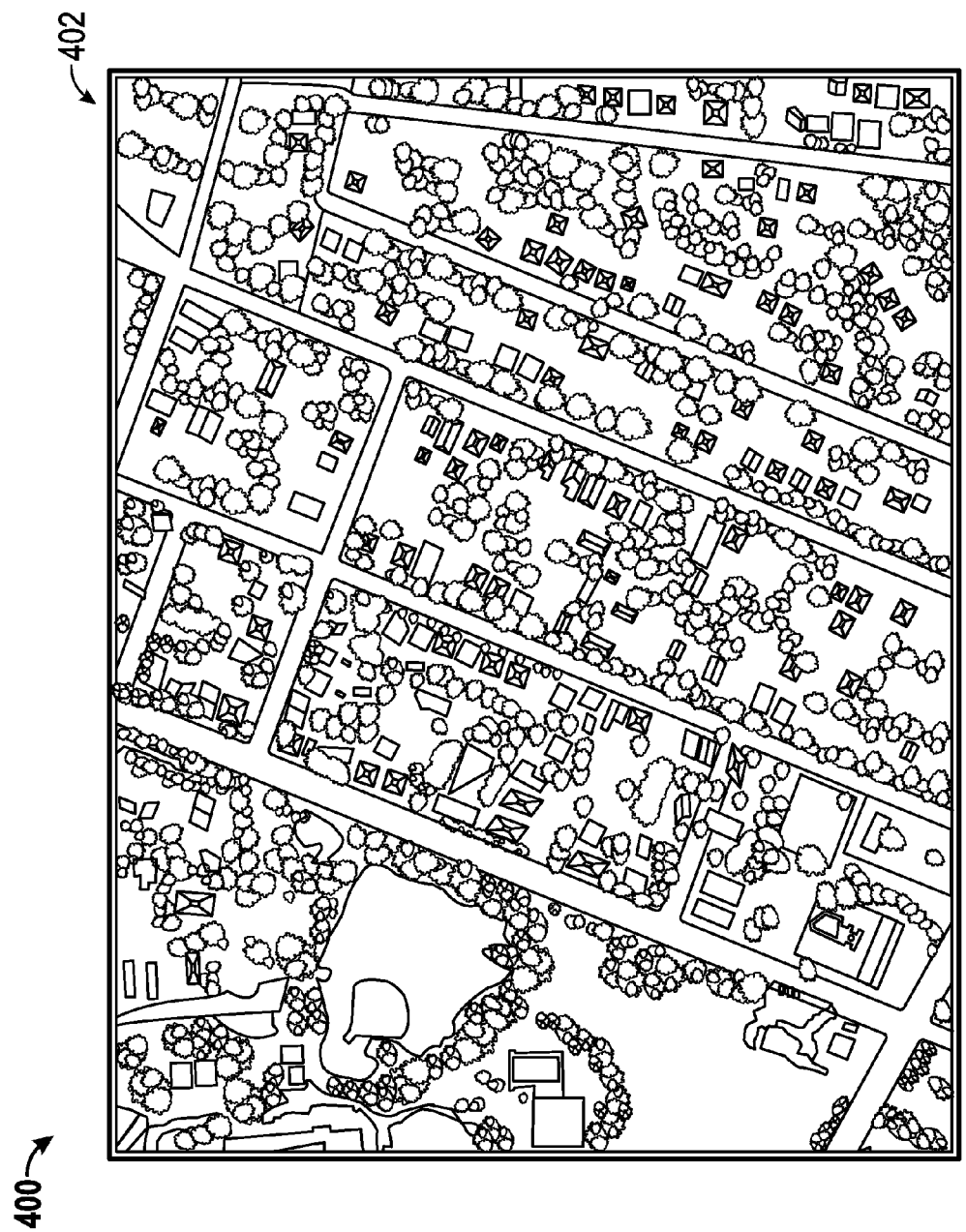
FIGS. 4A-4D are example illustrations associated with the example process of FIG. 3.

The process 300 begins by proceeding from beginning step 301 when a graphical user interface 224 for drawing a rectangle is opened on the client 110 to step 302 when content 226 configured for display is received. FIG. 4A is an example illustration 400 of content 226 provided for display by the graphical user interface 224 on the client 110. The content 226 is a raster format image 402 of an aerial perspective of a geographic region. The content 226 is stored in memory 220 of the client 110 after being downloaded from a server over the network 150.

Figure 4B:
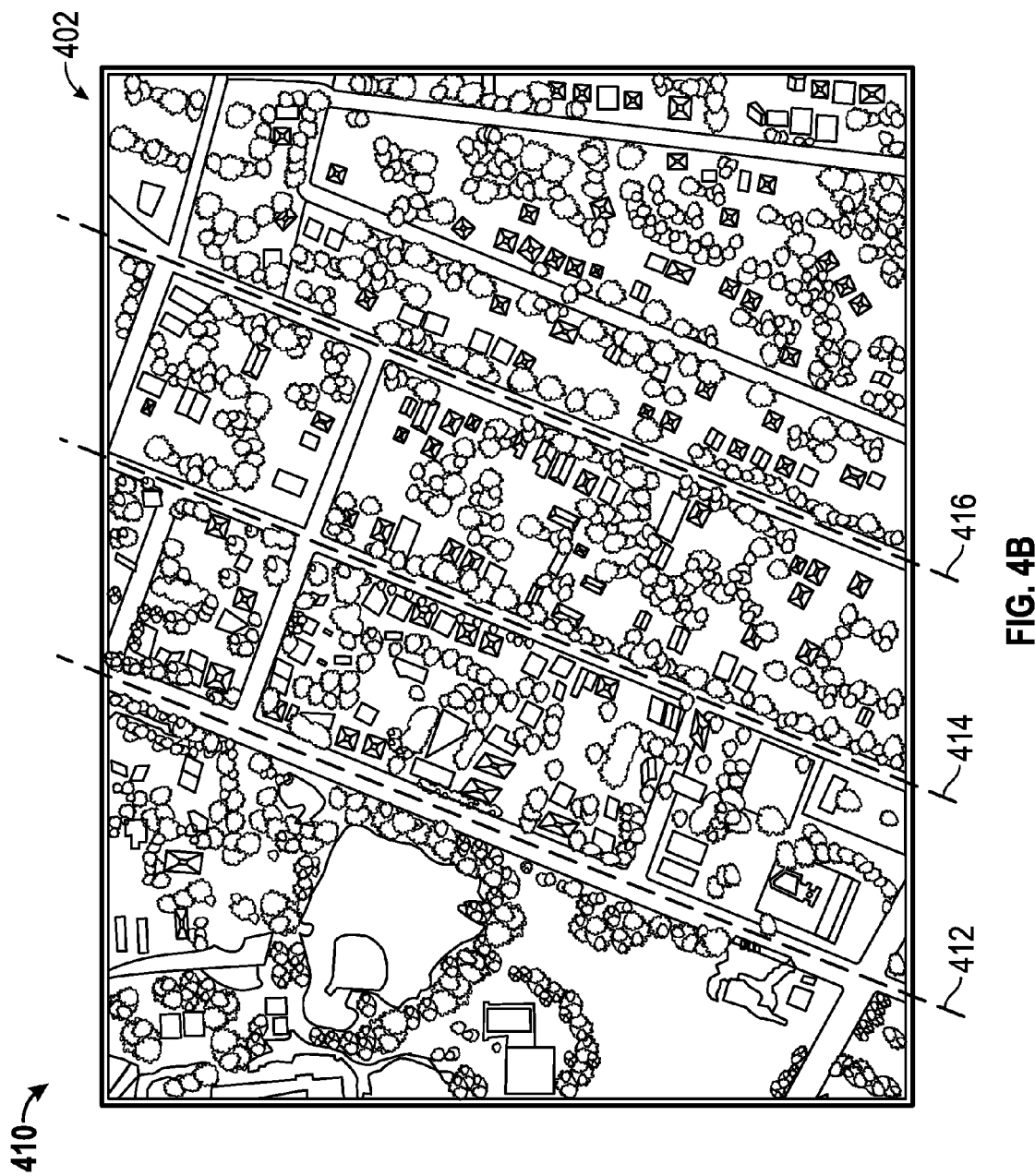

In step 303, the raster format image 402 is analyzed using a Hough (or alternatively, Radon) transform to identify a dominant angle of the raster format image 402. FIG. 4B provides an example illustration 410 of the raster format image 402 after the Hough transform analysis. Three lines 412, 414, and 416 have been detected from the raster format image 402 as a result of the Hough transform. The three lines 412, 414, and 416 are analyzed to identify a dominant angle for the three lines 412, 414, and 416. The skew angle is set as the dominant angle of the analyzed content 226.

Figure 4C:
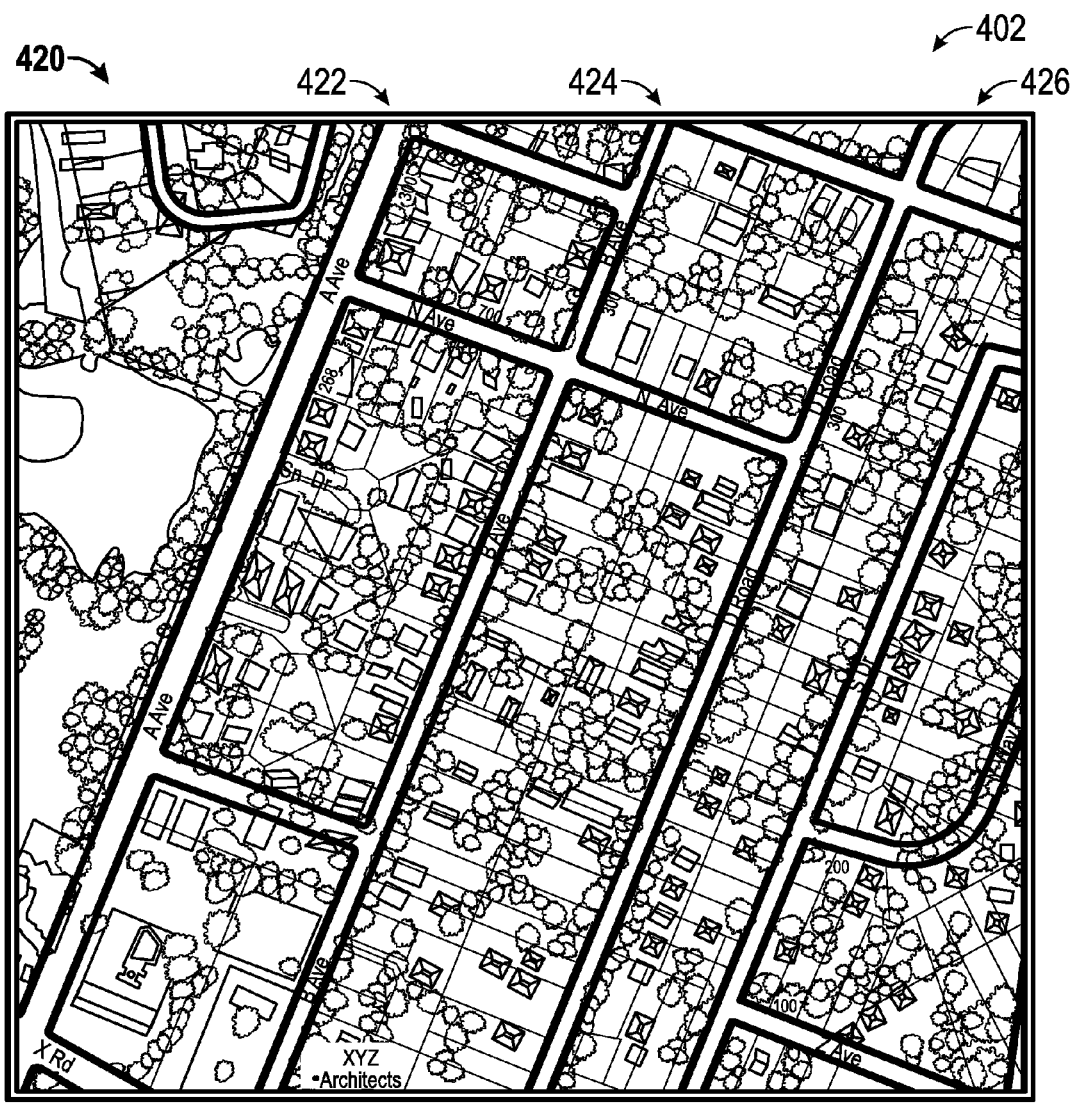

Alternatively, the raster format image 402 can be analyzed using user-defined inputs to identify a dominant angle of the user-defined inputs. With reference to FIG. 4C, an example illustration 420 of the raster format image 402, the content 226 includes both the raster format image 402 and various streets and associated names input by a user and overlaid on top of the raster format image 402. Three streets 422, 424, and 426 are identified as defining the dominant angle for the x-y axes of the geographic region.

Figure 4D:
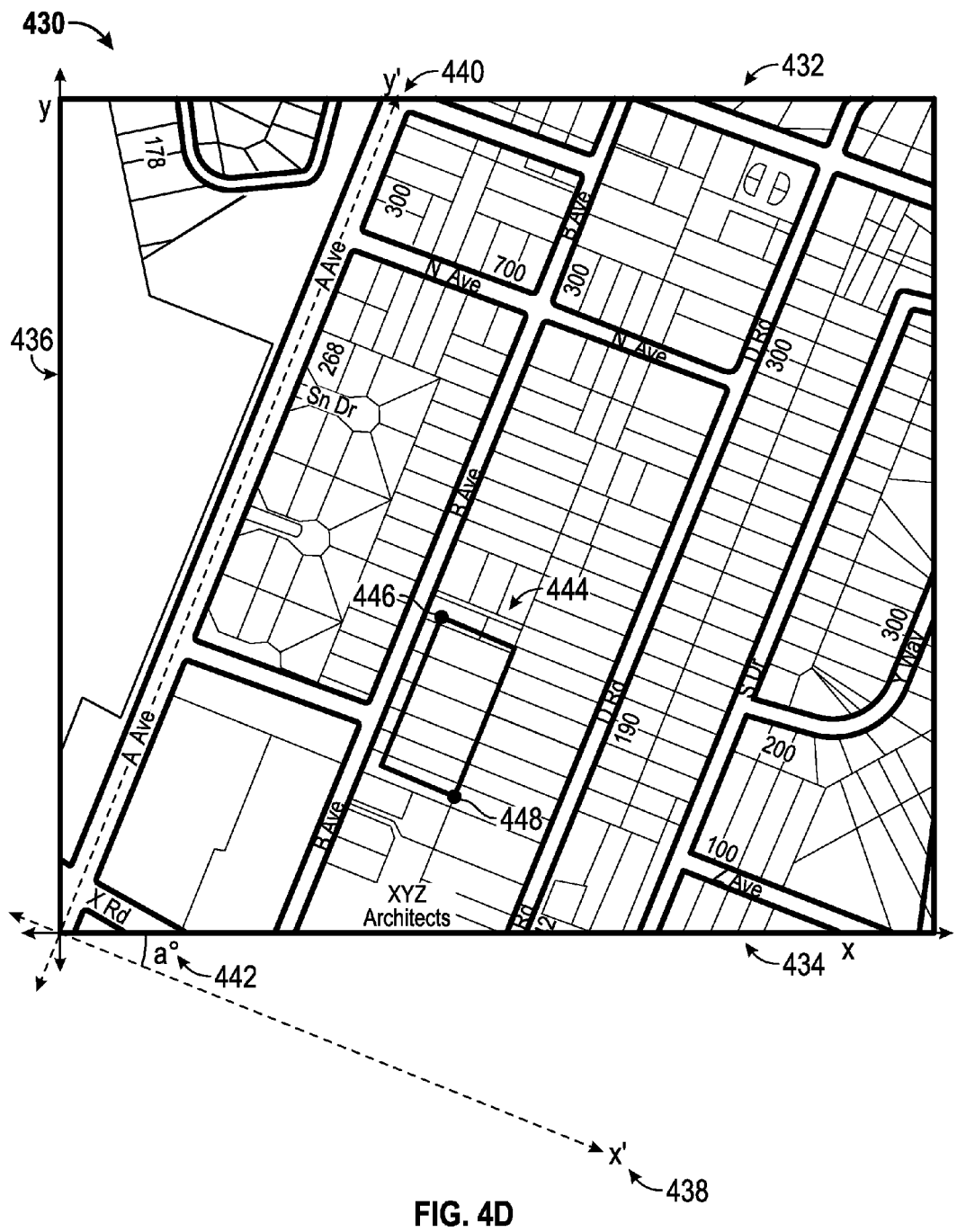

FIG. 4D is an example illustration 430 of a raster image 432 based on the analysis. The default x axis 434 of the graphical user interface 224 is aligned with the cardinal directions east and west, and the default y axis 436 of the graphical user interface 224 is aligned with the cardinal directions north and south. A rotated axes having x' axis 438 and a y' axis 436 is provided for the graphical user interface 224 based on the skew angle α 442 identified in step 303. The rotated axes 438 and 436 is rotated by skew angle α 442 about the default x-y axes 434 and 432.

In step 304 an input request is received on the client 110 from a mouse 216 to draw a rectangle overlaid upon the raster image 432. The input request includes a first click of the mouse 216 at a first point 446, and a second click of the mouse 216 at a second point 448 that is diagonally opposite the first point 446. The remaining two points of the rectangle 444 are identified based on the first point 446, the second point 448, and the skew angle α 442.

In step 305, a resulting rectangle 444 is drawn that is aligned along the x' axis 438 and the y' axis 436. The rectangle 444 is overlaid upon the raster image 432. The process 300 ends in step 306.

Figure 5:
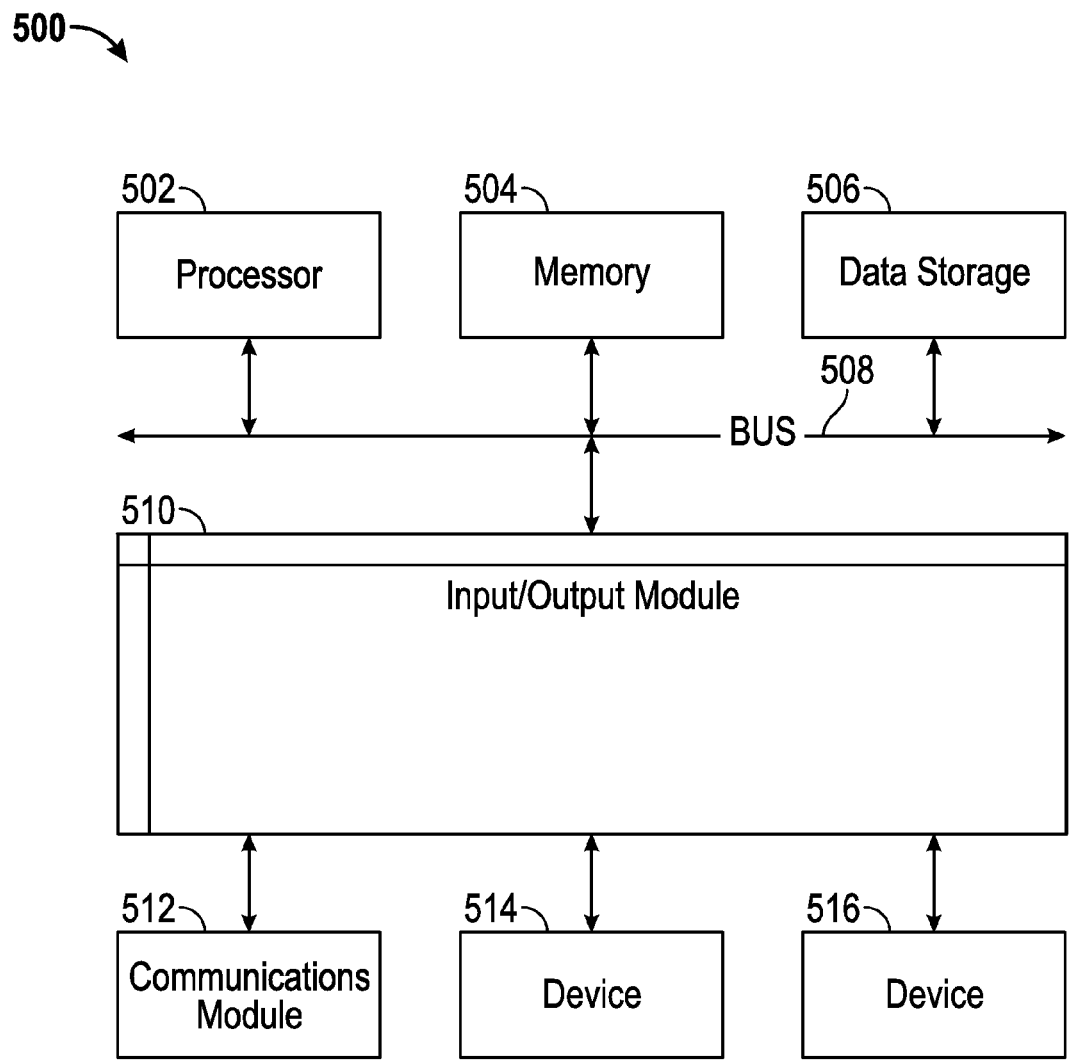
FIG. 5 is a block diagram illustrating an example computer system with which the client of FIG. 2 can be implemented.

FIG. 5 is a block diagram illustrating an example computer system 500 with which the client 110 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110) includes a bus 508 or other communication mechanism for communicating information, and a processor 502 (e.g., processor 212) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. The input/output module 510 is configured to connect to a communications module 512. Example communications modules 512 (e.g., communications module 218) include networking interface cards, such as Ethernet cards and modems. In certain aspects, the input/output module 510 is configured to connect to a plurality of devices, such as an input device 514 (e.g., input device 216) and/or an output device 516 (e.g., output device 214). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a LED (light emitting diode), CRT (cathode ray tube), or LCD (liquid crystal display) screen, for displaying information to the user.

According to one aspect of the present disclosure, the client 110 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 502 for execution. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for drawing a rotated rectangle on an electronic device, the method comprising:
  receiving content configured for display in a graphical user interface having a default x axis aligned with the cardinal directions east and west and a default y axis aligned with the cardinal directions north and south;
  analyzing the content to identify a skew angle associated with the content, wherein the skew angle is based on a dominant angle identified from lines within the content configured for display, wherein the skew angle is used to define rotated x' and y' axes, wherein the rotated x' and y' axes are configured by rotating the default x and y axes by the identified skew angle;
  receiving an input request to draw a rotated rectangle overlaid upon the content, wherein the rotated rectangle is not aligned with the x and y axes of the graphical user interface; and
  providing, for display, the rotated rectangle overlaid upon the content based upon the input request, the rotated rectangle drawn according to the skew angle such that each edge of the rectangle is aligned in parallel with one of the rotated x' and y' axes, while the content remains unrotated.

2. The computer-implemented method of Claim 1, wherein the content comprises a raster image.

3. The computer-implemented method of Claim 2, wherein the raster image comprises a map.

4. The computer-implemented method of Claim 2,
  wherein analyzing the content to identify the skew angle comprises analyzing the raster image using at least one of a Hough transform and a Radon transform to identify a dominant angle of at least a portion of the raster image, and
  wherein the skew angle is based on the dominant angle.

5. The computer-implemented method of Claim 2, wherein the rotated rectangle is provided for display overlaid on the raster image.

6. The computer-implemented method of Claim 1,
  wherein the content further comprises at least one user-defined input, wherein analyzing the content to identify the skew angle comprises analyzing the at least one user-defined input to identify a dominant angle of the user-defined input, and wherein the skew angle is based on the dominant angle.

7. The computer-implemented method of Claim 6, wherein the at least one user-defined input comprises an indicator of a road, an indicator of a building, or an indicator of a geographical landmark.

8. The computer-implemented method of Claim 1, wherein analyzing the content to identify the skew angle comprises analyzing a subset of the content identified by the user.

9. The computer-implemented method of Claim 1, wherein the input request comprises at least one of a rectangle size, a rectangle location, and a rectangle orientation.

10. A system for drawing a rotated rectangle on an electronic device, the system comprising:

a memory comprising content configured for display in a graphical user interface having a default x axis aligned with the cardinal directions east and west and a default y axis aligned with the cardinal directions north and south; and a processor configured to execute instructions to:

analyze the content to identify a skew angle associated with the content, wherein the skew angle is based on a dominant angle identified from lines within the content configured for display, wherein the skew angle is used to define rotated x' and y' axes, wherein the rotated x' and y' axes are configured by rotating the default x and y axes by the identified skew angle;

receive an input request to draw a rotated rectangle overlaid upon the content, wherein the rotated rectangle is not aligned with the x and y axes of the graphical user interface; and provide, for display, the rotated rectangle overlaid upon the content based upon the input request, the rotated rectangle drawn according to the skew angle such that each edge of the rectangle is aligned in parallel with one of the rotated x' and y' axes, while the content remains unrotated, wherein the content comprises a raster image.

11. The system of Claim 10, wherein the content further comprises at least one user-defined input, wherein the processor being configured to analyze the content to identify the skew angle comprises the processor being configured to analyze the at least one user-defined input to identify a dominant angle of the user-defined input, and wherein the skew angle is based on the dominant angle.

12. The system of Claim 11, wherein the at least one user-defined input comprises an indicator of a road, an indicator of a building, or an indicator of a geographical landmark.

13. The system of Claim 10, wherein the raster image comprises a map.

14. The system of Claim 10, wherein the content comprises a raster image;

wherein the processor being configured to analyze the content to identify the skew angle comprises the processor being configured to analyze the raster image using at least one of a Hough transform and a Radon transform to identify a dominant angle of at least a portion of the raster image, and wherein the skew angle is based on the dominant angle.

15. The system of Claim 10, wherein the content comprises a raster image, and wherein the rotated rectangle is provided for display overlaid on the raster image.

16. The system of Claim 10, wherein the processor being configured to analyze the content to identify the skew angle comprises the processor being configured to analyze a subset of the content identified by the user.

17. The system of Claim 10, wherein the input request comprises at least one of a rectangle size, a rectangle location, and a rectangle orientation.

18. A non-transitory machine-readable storage medium comprising machine-readable instructions for causing a processor to execute a method for drawing a rotated rectangle on an electronic device, comprising:

receiving content comprising a raster image of a map configured for display in a graphical user interface having a default x axis aligned with the cardinal directions east and west and a default y axis aligned with the cardinal directions north and south;

analyzing the content to identify a skew angle associated with the content using at least one of a Hough transform and a Radon transform to identify a dominant angle of at least a portion of the raster image, wherein the skew angle is based on the dominant angle, and wherein the skew angle is used to define rotated x' and y' axes, wherein the rotated x' and y' axes are configured by rotating the default x and y axes by the identified skew angle;

receiving an input request to draw a rotated rectangle overlaid upon the content, wherein the rotated rectangle is not aligned with the x and y axes of the graphical user interface; and providing, for display, the rotated rectangle overlaid upon the content based upon the input request, the rotated rectangle drawn according to the skew angle such that each edge of the rectangle is aligned in parallel with one of the rotated x' and y' axes, while the content remains unrotated.

19. The non-transitory machine-readable storage medium of Claim 18, wherein the content further comprises at least one user-defined input, wherein analyzing the content to identify the skew angle comprises analyzing the at least one user-defined input to identify a dominant angle of the user-defined input, and wherein the skew angle is based on the dominant angle.

20. The non-transitory machine-readable storage medium of Claim 19, wherein the at least one user-defined input comprises an indicator of a road, an indicator of a building, or an indicator of a geographical landmark.

* * * * *